(12) United States Patent
Schumann et al.

(10) Patent No.: US 10,903,686 B2
(45) Date of Patent: Jan. 26, 2021

(54) ENERGY TRANSMISSION DEVICE AND ENERGY TRANSMISSION METHOD

(71) Applicant: Robert Bosch GmbH, Stuttgart (DE)

(72) Inventors: Philipp Schumann, Stuttgart (DE); Steffen Eppler, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 16/345,340

(22) PCT Filed: Aug. 8, 2017

(86) PCT No.: PCT/EP2017/070070
§ 371 (c)(1),
(2) Date: Apr. 26, 2019

(87) PCT Pub. No.: WO2018/077504
PCT Pub. Date: May 3, 2018

(65) Prior Publication Data
US 2019/0319486 A1    Oct. 17, 2019

(30) Foreign Application Priority Data

Oct. 27, 2016  (DE) .................. 10 2016 221 225

(51) Int. Cl.
*H02J 50/10*     (2016.01)
*H02J 50/40*     (2016.01)
*H02J 7/02*      (2016.01)

(52) U.S. Cl.
CPC ............. *H02J 50/10* (2016.02); *H02J 50/40* (2016.02); *H02J 7/025* (2013.01)

(58) Field of Classification Search
CPC ............. H02J 50/10; H02J 50/40; H02J 7/025
See application file for complete search history.

(56) References Cited

U.S. PATENT DOCUMENTS

| | | | |
|---|---|---|---|
| 2013/0054145 A1* | 2/2013 | Bittar | G01V 11/002 702/7 |
| 2015/0084585 A1* | 3/2015 | Moran | H02J 50/12 320/108 |

(Continued)

FOREIGN PATENT DOCUMENTS

| | | | |
|---|---|---|---|
| JP | 2010527226 A | 8/2010 | |
| JP | 2014176125 A | 9/2014 | |

(Continued)

OTHER PUBLICATIONS

International Search Report for Application No. PCT/EP2017/070070 dated Jan. 12, 2017 (English Translation, 2 pages).

*Primary Examiner* — Pinping Sun
(74) *Attorney, Agent, or Firm* — Michael Best & Friedrich LLP

(57) ABSTRACT

The invention relates to an energy transmission device (1, 10) for the contactless transmission of electric energy, comprising several transmitting coils (2, 3, 11, 12, 13, 30, 31, 32), several receiver coils (4, 5, 14, 15), and a control device (6, 16) which is designed to sequentially control a predetermined number of the transmitting coils (2, 3, 11, 12, 13, 30, 31, 32) in an energy transmission mode. The invention further relates to a corresponding energy transmission method.

16 Claims, 3 Drawing Sheets

(56) References Cited

U.S. PATENT DOCUMENTS

| | | | | |
|---|---|---|---|---|
| 2015/0249484 A1* | 9/2015 | Mach | .................. | H02J 5/005 |
| | | | | 307/104 |
| 2015/0364929 A1* | 12/2015 | Davis | .................. | H01F 38/14 |
| | | | | 307/104 |
| 2016/0079798 A1* | 3/2016 | Jeong | .................. | H02J 50/40 |
| | | | | 320/108 |
| 2017/0156119 A1* | 6/2017 | Neves | .................. | H04B 7/02 |

FOREIGN PATENT DOCUMENTS

| | | | | |
|---|---|---|---|---|
| WO | 2016024869 | | 2/2016 | |
| WO | WO-2016024869 A1 * | | 2/2016 | ............. H02J 7/045 |

* cited by examiner

ENERGY TRANSMISSION DEVICE AND ENERGY TRANSMISSION METHOD

BACKGROUND OF THE INVENTION

The present invention relates to an energy transmission device for the contactless transmission of electrical energy, and a corresponding energy transmission method.

The present invention is described below primarily with respect to the charging of portable electronic devices such as mobile telephones or tablet PCs. However, the present invention is in no way limited to this application, and may be used anywhere where electrical energy is to be transmitted, for example, when charging electric vehicles.

Electronic devices such as mobile telephones typically have batteries which supply the electrical energy necessary for the operation of the device. If the batteries are empty, they must be charged.

Generally, wired charging devices are used, which are connected to the electronic device via a cable and which provide the charging voltage for charging the batteries. Since cables are impractical, wireless, in particular inductive, charging methods are also increasingly being used.

With inductive charging methods, the electrical energy for charging the battery is transmitted from a transmitting coil or primary side to a receiving coil or secondary side. When using a coil on the primary side and a coil on the secondary side, respectively, they must be positioned exactly with respect to one other. Thus, free positioning is not possible.

In order to make free positioning possible, a plurality of coils may be used on the primary and/or secondary side, and the coil pair having the highest coupling factor may be used for energy transmission.

It should be noted that metal objects which are situated between the coils may heat up.

Therefore, metallic object detection systems may be used which detect metallic objects and prevent charging if such an object has been detected.

SUMMARY OF THE INVENTION

The present invention discloses an energy transmission device, and an energy transmission method.

Accordingly, the following is provided:

An energy transmission device for the contactless transmission of electrical energy, comprising a plurality of transmitting coils and a plurality of receiving coils, and comprising a control device which is configured to activate a predetermined number of the transmitting coils sequentially in an energy transmission mode.

Furthermore, the following is provided:

An energy transmission method for the contactless transmission of electrical energy, comprising provision of a plurality of transmitting coils and a plurality of receiving coils, and sequential activation of a predetermined number of the transmitting coils in an energy transmission mode.

The energy transmission device according to the present invention may, for example, be used for charging mobile devices, for example, mobile telephones, tablet PCs, or the like. However, the energy transmission device may also be used, for example, for inductively charging vehicles or the like.

With respect to the energy transmission device, transmitting coils are understood to mean the coils which are arranged on the primary side or the side of the energy source, for example, the electric power grid or a power outlet. With respect to the energy transmission device, the receiving coils refer to the coils which are arranged on the side of the receiver, i.e., the secondary side. Thus, the transmitting coils transmit electrical energy, for example, in the form of electromagnetic fields. The receiving coils absorb this electrical energy and transfer it to the respective device.

With respect to activation in the energy transmission mode, the control device may supply the transmitting coils, for example, with an alternating current or an alternating voltage, so that they develop the desired electromagnetic fields. On the receiving side, the individual receiving coils may be coupled, for example, to a rectifier, so that a rectified coil current or a rectified voltage is available which can be used in the receiver, for example, for charging batteries.

The plurality of transmitting coils and the plurality of receiving coils respectively form a so-called multi-coil system on the transmitting side and the receiving side. Such systems enable free positioning of the transmitting coils with respect to the receiving coils. Various coil pairs thus result, depending on the position of the transmitter multi-coil system with respect to the receiver multi-coil system.

In known systems, a single coil pair, the one having the highest coupling factor, is activated in quasi-continuous operation. The individual coils are thus operated at full power, generally over a period of multiple seconds. If metallic objects are present between the coils, they may heat up, as already described.

However, with respect to the present invention, the individual coils are not activated in quasi-continuous operation. Rather, a number of coil pairs are selected, and they are activated sequentially, i.e., in an alternating manner or consecutively. Thus, each individual coil is activated for only a short period; however, in total, electrical energy is continuously transmitted between the transmitting coils and the receiving coils.

However, since the electrical energy is always transmitted via other coil pairs and thus at different locations, a metallic object heats up only slightly if it is situated between one of the coil pairs.

The present invention thus makes it possible to provide an energy transmission device without metallic object detection, and simultaneously allows free positioning of the transmitting coils with respect to the receiving coils.

In one embodiment, the control device may be configured to identify the respective coupling factor to the individual receiving coils, for each of the transmitting coils in an identification mode, and to select, according to the coupling factor, the transmitting coils which are activated in the energy transmission mode, based on the coil pair made up of a transmitting coil and a receiving coil having the greatest coupling factor. Thus, coil pairs are not arbitrarily selected for the energy transmission. Rather, the coil pairs having the greatest coupling factors are selected for the energy transmission, whereby the efficiency of the energy transmission is maximized.

In one embodiment, in the case of sequential activation of the transmitting coils, the control device may be configured to activate next the respective transmitting coil which has the greatest spacing from the last-activated transmitting coil. Thus, for example, in each cycle, all selected transmitting coils are activated exactly once, and then the cycle is repeated. The sequence in which the transmitting coils are activated is thus determined by the aforementioned spacing. Should a metallic object be situated between the coils, it is thus ensured that said object is heated up locally in locations which are as far apart as possible. By switching between the transmitting coils, i.e., sequential activation, little heat is thus generated in the object.

Of course, another sequence may be chosen when activating the transmitting coils. For example, the average spacing between the transmitting coils may be maximized. In addition, for example, every possible sequence for activating the transmitting coils may be examined.

In one embodiment, in the case of sequential activation of the transmitting coils, the control device may be configured to activate each of the transmitting coils for a period of less than one second, in particular less than 500 milliseconds, less than 250 milliseconds, or less than 100 milliseconds. The longer a metallic object (if present) is subjected to the electromagnetic fields of one of the transmitting coils, the more intensely it heats up. In addition to the current in the coil, the period of the activation of each individual coil influences the heat which is generated in a metallic object locally via the transmitting coil. Depending on the application, it is possible to choose, by means of the aforementioned periods, how rapidly the control device switches between the coils.

In addition or alternatively, the computing device may also determine the period dynamically, based on the spacing of the consecutively activated coils, wherein the period is greater if the spacing is greater.

In another additional or alternative embodiment, a maximum magnitude may be predetermined for the current via which the individual transmitting coils are operated. The period and the maximum magnitude for this current may then be chosen based on a limit value for the maximum energy input into a metallic object which possibly lies on top of the respective transmitting coil.

Given an identical current, in the case of a coil having a high coupling factor, more electrical energy is transferred to the secondary side than in the case of a coil having a low coupling factor. The current with which the individual transmitting coils can be operated may therefore, for example, be maximized for each transmitting coil, corresponding to its coupling factor, in such a way that the limit value for the maximum energy input is not exceeded. The period for activating the individual transmitting coils may also be varied, so that the average energy input into a metallic object does not exceed the predetermined limit value.

In one embodiment, the energy transmission device may comprise an alternating current source or alternating voltage source which is configured to generate an alternating current or an alternating voltage for activating the transmitting coils, and a toggle switch which is configured to couple the alternating current source or alternating voltage source electrically to one of the coils in a controllable manner. The control device may be configured to activate the toggle switch in order to activate one of the respective transmitting coils. Thus, a plurality of transmitting coils may be activated via one source. For example, two sources may also be present, or the toggle switch may couple the alternating current source or alternating voltage source simultaneously to two of the transmitting coils. If more than two transmitting coils are available, for example, two coils may also be used simultaneously in order to transmit electrical energy. Before using two coil pairs, for example, it may also be checked whether the spacing between the respective coil pairs is great enough (greater than a predetermined threshold value).

In one embodiment, the predetermined number may be determined dynamically, based on a limit value for the coupling factor between the respective transmitting coil and one of the receiving coils. Thus, all the coil pairs having coupling factors which are above the predetermined limit value are activated sequentially. Thus, instead of a fixed number of, for example, 2, 3, 4, 5, 6, or more transmitting coils, it is dynamically determined how many transmitting coils are used. If, for example, 10 transmitting coils and 10 receiving coils are present, and if said coils are situated one above the other in pairs, and thus have a high coupling factor, all 10 coil pairs may also be used for the energy transmission.

Of course, a minimum number of coil pairs, which are used at a minimum for the energy transmission, may also be predetermined. For example, it may be predetermined that at least two coil pairs must always be used for the energy transmission, even if their coupling factor is below the limit value.

In the case that no two coils are found having a sufficient coupling factor (for example, a predetermined minimum coupling factor), for example, it may be indicated that the receiving coils must be repositioned with respect to the transmitting coils.

In one embodiment, the control device may be configured to determine the coupling factor for the individual transmitting coils on the transmitting side or primary side, in that said control device supplies each of the transmitting coils consecutively with a predetermined current, in particular an alternating current, and measures the resulting current at each of the receiving coils. The current when measuring the coupling factor may in particular be less than the current during the energy transmission. The coupling factor does not have to be determined exactly. Rather, it is sufficient to determine the coupling factor qualitatively. It is thus sufficient to determine the receiving coils at which the respective largest current is measured. If the transmitting and receiving coils are identical, i.e., if they in particular have the same inductance, the coupling factor may nonetheless be approximately calculated as the ratio of current in the receiving coil to current in the transmitting coil. In the case of different inductances of the transmitting and receiving coils, the different inductances may also be taken into account during the calculation.

In one embodiment, the control device may be configured to determine the coupling factor on the transmitting side or primary side for the individual transmitting coils, in that it measures the inductance of the transmitting coils with open receiving coils and with short-circuited receiving coils. In addition, the control device may comprise a switching device on the receiving side or secondary side which is configured to open the receiving coils individually or simultaneously, i.e., not to couple their contacts to other elements, and to short-circuit the receiving coils. The coupling factor may then be determined as the square root of one minus the ratio of the inductances (short circuit/open) of the respective transmitting coil. The inductance may thus be determined, for example, respectively based on a measurement of the resonant frequency of an oscillating circuit having a known capacitance.

In one embodiment, the control device may comprise two individual computing devices, for example, controllers. One of the computing devices may, for example, be arranged on the primary side, and one of the computing devices may be arranged on the secondary side. The computing devices may, for example, be in communicative contact with one another via a wireless communication interface. The secondary-side computing device may, for example, thus inform the primary-side computing device about the receiving coil and the instant at which the highest current was measured, and/or how large the measured current is. Furthermore, the primary-side computing device may inform the secondary-side computing device, for example, about when and which of the receiving coils are to be opened or short-circuited, and about the coil pairs via which the energy transmission is ultimately carried out.

The embodiments and refinements mentioned above may be combined in any arbitrary manner, as appropriate. Further possible embodiments, refinements, and implementations of the present invention also include combinations, which are not explicitly mentioned, of features of the present invention which have been previously described or which are described below with respect to the exemplary embodiments. In particular, those skilled in the art will also add individual aspects as improvements or refinements to the respective basic form of the present invention.

BRIEF DESCRIPTION OF THE DRAWINGS

The present invention will be described in greater detail below, based on the exemplary embodiments specified in the schematic figures of the drawings. The following are shown.

In all figures, identical or functionally identical elements and devices have been provided with the same reference characters, unless stated otherwise.

DETAILED DESCRIPTION

Figure 1:
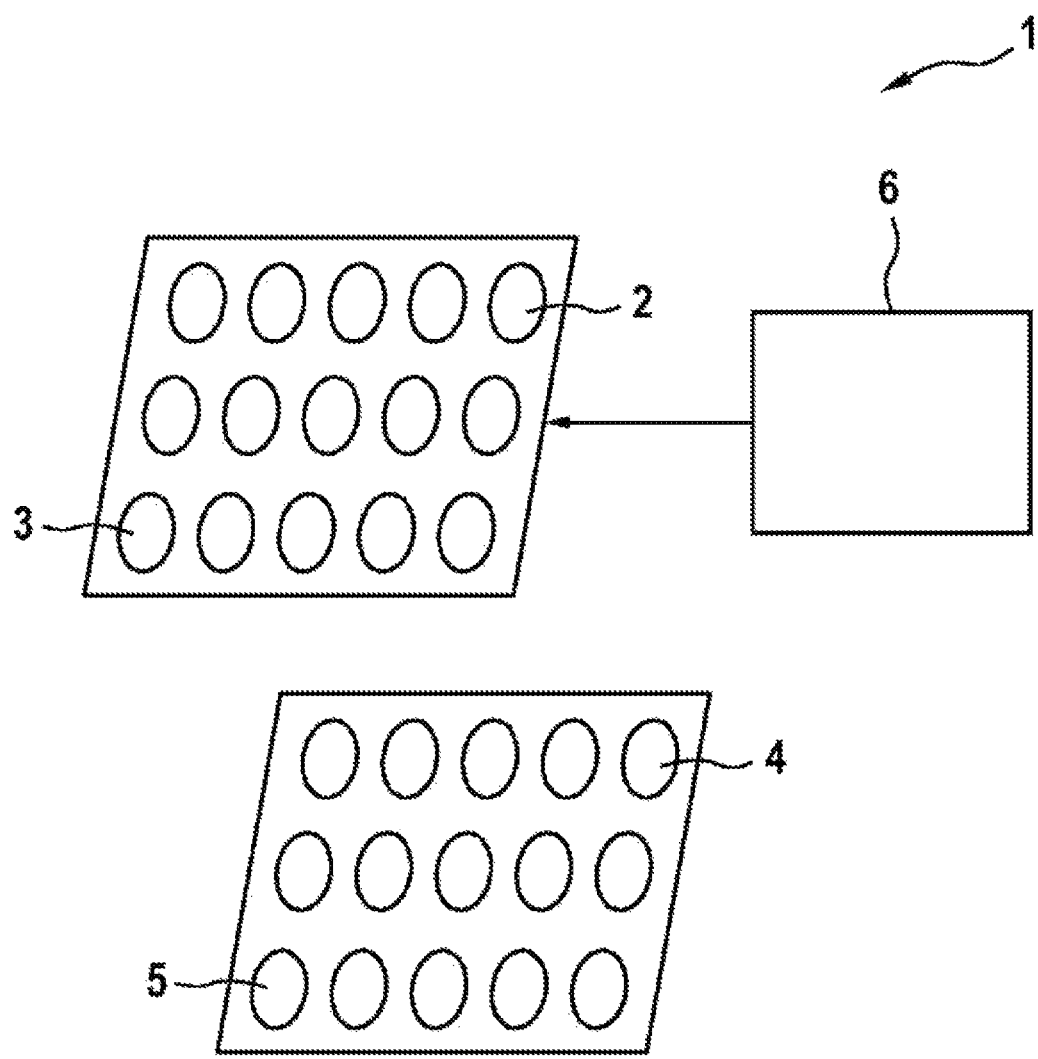
FIG. 1 shows a block diagram of one embodiment of an energy transmission device according to the present invention.

FIG. 1 shows an energy transmission device 1 for the contactless transmission of electrical energy, for example, for charging batteries in an electric device.

The energy transmission device 1 comprises transmitting coils 2, 3 on the primary side, i.e., on the transmitting side 15. Only the first and the last transmitting coil 2, 3 are provided with reference characters for the sake of clarity. The transmitting coils are arranged in a 3×5 matrix of transmitting coils 2, 3 having three rows and five columns. It is to be understood that this arrangement is merely exemplary. Of course, depending on the application, another number of transmitting coils 2, 3 or another arrangement of the transmitting coils 2, 3 may be chosen. Similarly to the arrangement of the transmitting coils 2, 3, 15 receiving coils 4, 5 are depicted on the receiving side or secondary side. Here as well, for the sake of clarity, only the first and the second receiver coils 4, 5 are provided with reference characters.

Furthermore, a control device 6 is depicted, which is coupled to the transmitting coils 2, 3 in order to activate them in a transmission mode or to supply them with an alternating current or an alternating voltage. However, the control device 6 does not activate all or randomly selected transmitting coils 2, 3. Rather, the control device 6 activates a predetermined number of transmitting coils 2, 3 sequentially, i.e., consecutively. This results in electric power being continuously transmitted between the transmitting coils 2, 3 and the receiving coils 4, 5. Simultaneously, the location at which the electrical energy is transmitted is continuously changed. If a metallic object is present between the transmitting coils 2, 3 and the receiving coils 4, 5, said object is thus heated up only locally and for a brief period, until the next transmitting coil 2, 3 is activated.

Particularly in mobile devices, for example, smartphones, it may occur that they are not positioned exactly on top of the transmitting coils 2, 3, and therefore, the transmitting coils 2, 3 and the receiving coils 4, 5 are not exactly one above the other. It may also be that transmitting coils 2, 3 and receiving coils 4, 5 which are not at the same location in the geometric matrix arrangement are strongly coupled to one another.

In order to design the energy transmission as efficiently as possible, in an identification mode, the control device 6 may determine a coupling factor to one of the receiving coils 4, 5, for each of the transmitting coils 2, 3. The control device 6 may then use the transmitting coils 2, 3 having the greatest coupling factor for the energy transmission. The number of transmitting coils 2, 3 to be used may thus, for example, be predetermined. For example, in an application, it may be predetermined that the four transmitting coils 2, 3 having the four greatest coupling factors are to be used for the energy transmission. Alternatively, the number of transmitting coils 2, 3 to be used may be individually determined. For example, it may be predetermined that all transmitting coils 2, 3 of which the coupling factor is above a predetermined threshold value are to be used. Any variable which allows qualitative determination about the actual coupling factor may also be treated as a coupling factor. For example, a current measured at a receiving coil 4, 5 may be designated as the coupling factor if the current in the transmitting coil 2, 3 is known.

In order to keep the local energy input in a metallic object and thus the heating thereof as low as possible, in the case of sequential activation of the transmitting coils 2, 3, the control device 6 may activate next the respective transmitting coil 2, 3 which has the greatest spacing from the last-activated transmitting coil 2, 3. It is to be understood that switching back and forth between the two transmitting coils 2, 3 which are situated farthest from one another is therefore not intended if more than two transmitting coils 2, 3 are available for the energy transmission. Rather, the computing device 6 may determine a sequence for the activation of the transmitting coils 2, 3, so that the transmitting coils 2, 3 which are activated directly one after the other are as far away from one another as possible, or the average spacing between the transmitting coils 2, 3 which are activated consecutively, is maximized. In this case, the control device 6 may activate each of the transmitting coils 2, 3 for a predetermined period of, for example, less than 1 second or less than 500 ms, less than 250 ms, or less than 100 ms.

Alternatively, the computing device 6 may also determine the period dynamically, based on the spacing of the consecutively activated coils, wherein the period is greater if the spacing is greater.

Figure 2:
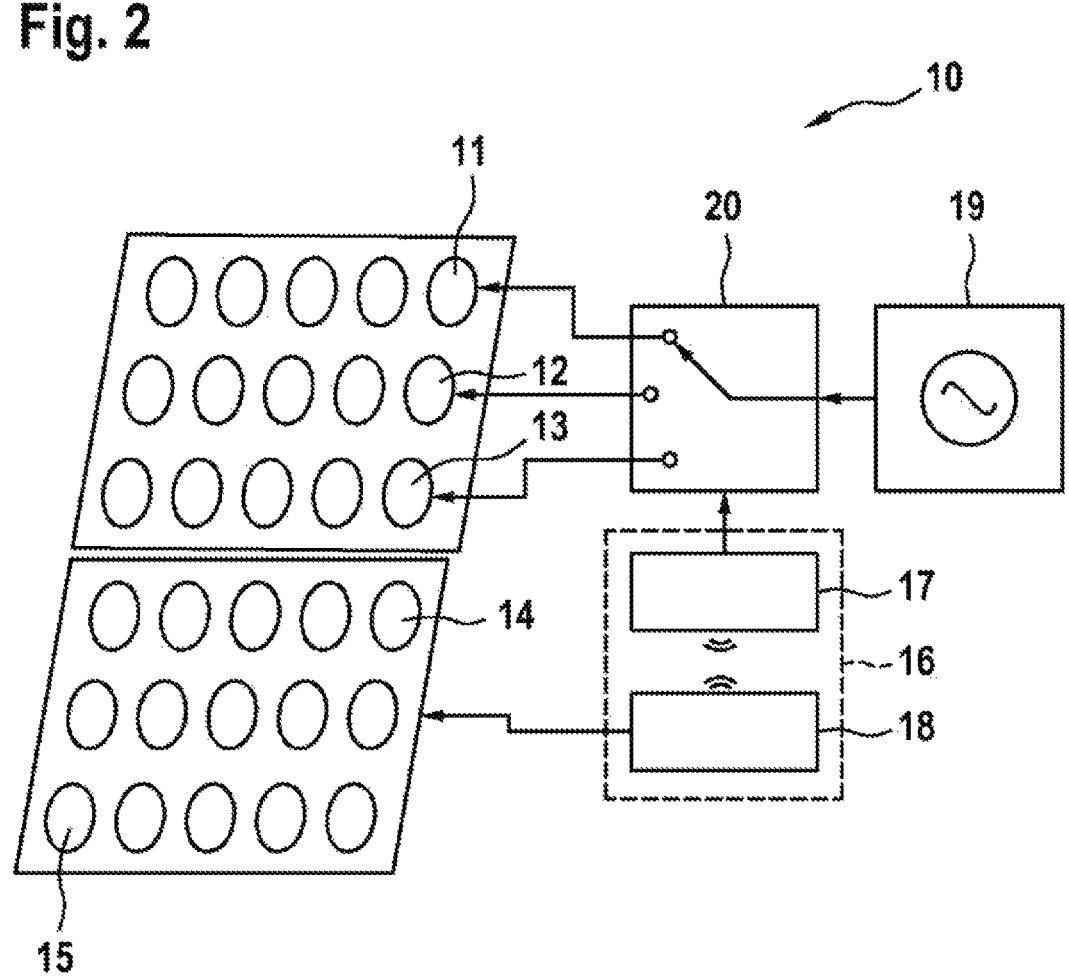
FIG. 2 shows a block diagram of another embodiment of an energy transmission device according to the present invention.

FIG. 2 shows an energy transmission device 10 according to the present invention, which is based on the energy transmission device 1. In addition to the 15 transmitting coils, three of which are denoted by 11, 12, 13, and the receiving coils 14, 15, the energy transmission device 10 has an alternating current source 19 and a toggle switch 20. The alternating-current source 19 may, for example, be an inverter or an alternating-current converter. However, the alternating-current source 19 may, for example, also be a transformer which transforms a grid voltage into the required voltage and which comprises a corresponding current regulator.

Furthermore, the control device 16 is divided into two parts. A computing device 17 is arranged on the transmitting side or primary side. A second computing device 18 is arranged on the receiving side or secondary side. The two computing devices 17 and 18 can communicate with one another wirelessly. For this purpose, for example, the alternating current via which the transmitting coils 11, 12, 13 are activated may be modulated. Alternatively, a separate communication interface, for example, NFC, Bluetooth, WLAN or the like, may be provided.

The computing device 17 activates the toggle switch 20, so that the respective desired transmitting coil 11, 12, 13 is supplied with electrical energy, here, the alternating current of the source 19. The toggle switch 20 is merely schematically coupled to three of the transmitting coils 11, 12, 13. It is to be understood that the toggle switch 20 is configured to activate all transmitting coils 11, 12, 13. Furthermore, the toggle switch 20 may also be configured to activate a plurality of transmitting coils 11, 12, 13 simultaneously. For example, the four transmitting coils on the corners of the matrix could have a high coupling factor. In such a case, the two transmitting coils which are opposite one another could respectively be activated simultaneously.

The computing device 17 may determine the coupling factor on the transmitting side or primary side for the individual transmitting coils 11, 12, 13, for example, in that said computing device supplies the transmitting coils 11, 12, 13 with a predetermined current, in particular, an alternating current. Simultaneously, the computing device 18 on the receiving side or secondary side may respectively measure the current in the individual receiving coils 14, 15 and transmit this information to the computing device 17. Based on the magnitude of the current, said computing device may then identify the coil pair or the coil pairs having the strongest coupling. Alternatively, the computing device 18 may transmit only the information about the magnitude of the coupling factor for the respective transmitting coil 11, 12, 13. As described above, the coupling factor may merely be measured qualitatively, for example, based on a secondary-side current measurement. Such a qualitative determination is sufficient to identify the transmitting coils 11, 12, 13 which are to be used for the energy transmission. In the case of the qualitative determination, for example, the magnitude of the current in the receiving coils 14, 15 may be used as a comparison value.

The computing device 17 may alternatively determine the coupling factor on the transmitting side or primary side for the individual transmitting coils 11, 12, 13, for example, in that said computing device measures the inductance of the transmitting coils 11, 12, 13 with open receiving coils 14, 15 and with short-circuited receiving coils 14, 15. For this purpose, the computing device 18 on the receiving side or secondary side may comprise a switching apparatus which is configured to open or short-circuit the receiving coils 14, 15 individually or simultaneously. The coupling factor may be determined as the square root of one minus the ratio of the inductances (short-circuit/open) of the respective transmitting coil 11, 12, 13. The computing device 17 may determine the inductance, for example, respectively based on a measurement of the resonant frequency of an oscillating circuit having a known capacitance.

Figure 3:
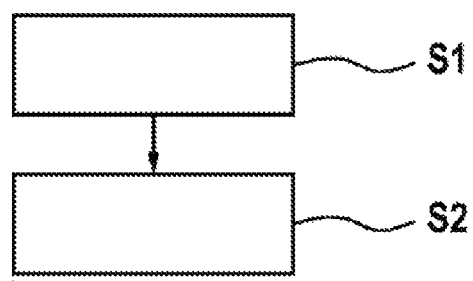
FIG. 3 shows a flow chart of one embodiment of an energy transmission method according to the present invention.

FIG. 3 shows a flow chart of an energy transmission method for the contactless transmission of electrical energy.

The method provides for the provision S1 of a plurality of transmitting coils 2, 3, 11, 12, 13, 30, 31, 32 and a plurality of receiving coils 4, 5, 14, 15. Furthermore, in an energy transmission mode, a predetermined number of the transmitting coils 2, 3, 11, 12, 13, 30, 31, 32 are sequentially activated S2.

When activating the transmitting coils 2, 3, 11, 12, 13, 30, 31, 32, an alternating current or an alternating voltage may be generated and may be respectively provided cyclically or sequentially at the corresponding one of the transmitting coils 2, 3, 11, 12, 13, 30, 31, 32. The number of transmitting coils 2, 3, 11, 12, 13, 30, 31, 32 to be activated may, for example, be determined dynamically, based on a limit value for the coupling factor between the respective transmitting coil 2, 3, 11, 12, 13, 30, 31, 32 and one of the receiving coils.

In order to identify the transmitting coils 2, 3, 11, 12, 13, 30, 31, 32 which are to be used for the energy transmission, in an identification mode, their coupling factor to one of the receiving coils 4, 5, 14, 15 may be respectively identified for each of the transmitting coils 2, 3, 11, 12, 13, 30, 31, 32. In the energy transmission mode, the transmitting coils 2, 3, 11, 12, 13, 30, 31, 32 to be activated may then be selected according to the coupling factor, based on the coil having the greatest coupling factor.

In the case of the sequential activation of the transmitting coils 2, 3, 11, 12, 13, 30, 31, 32, the local energy input and thus the local heating of a metallic object may be minimized if the respective transmitting coil 2, 3, 11, 12, 13, 30, 31, 32 which has the greatest spacing from the last-activated transmitting coil 2, 3, 11, 12, 13, 30, 31, 32 is activated next. In the case of sequential activation of the transmitting coils 2, 3, 11, 12, 13, 30, 31, 32, said transmitting coils may respectively be activated for a period of less than one second, in particular less than 500 milliseconds, less than 250 milliseconds, or less than 100 milliseconds.

Figure 4:
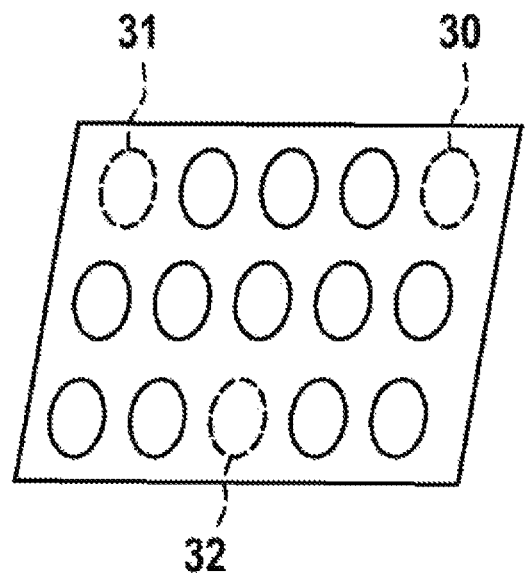
FIG. 4 shows a diagram for illustrating the activation of transmitting coils of one embodiment of an energy transmission device according to the present invention.
Figure 4:
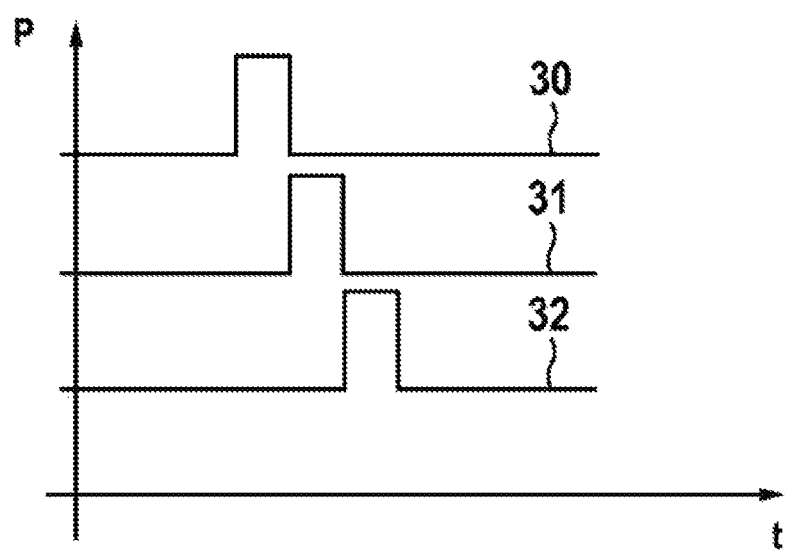

FIG. 4 shows a diagram for illustrating the activation of transmitting coils 30, 31, 32. The transmitting coils 30, 31, 32 are arranged in a matrix comprising 15 transmitting coils, as also shown in FIGS. 1 and 2. The transmitting coils 30, 31, 32 are shown by dashed lines and indicate the three transmitting coils 30, 31, 32 having the greatest coupling factor to corresponding receiving coils.

In the diagram, in addition to the transmitting coils 30, 31, 32, it is depicted how the individual transmitting coils 30, 31, 32 are activated. It is apparent that only one of the respective transmitting coils 30, 31, 32 is activated at one time. The transmitting coil 30 is initially activated, followed by the transmitting coil 31 and finally the transmitting coil 32. This sequence is continuously repeated during the entire charging process.

Although the present invention has been described above based on preferred exemplary embodiments, it is not limited thereto, but rather may be modified in various ways. In particular, the present invention may be changed or modified in manifold ways without departing from the essence of the present invention.

The invention claimed is:

1. An energy transmission device (1, 10) for a contactless transmission of electrical energy, the energy transmission device comprising a plurality of transmitting coils (2, 3, 11, 12, 13, 30, 31, 32) and a plurality of receiving coils (4, 5, 14, 15), and a controller (6, 16) which is configured to activate a predetermined number of the plurality of transmitting coils (2, 3, 11, 12, 13, 30, 31, 32) sequentially in an energy transmission mode, wherein in a case of sequential activation of the predetermined number of the plurality of transmitting coils (2, 3, 11, 12, 13, 30, 31, 32), the controller (6,

16) is configured to next activate a respective transmitting coil (2, 3, 11, 12, 13, 30, 31, 32) which has a greatest spacing from a last-activated transmitting coil (2, 3, 11, 12, 13, 30, 31, 32).

2. The energy transmission device (1, 10) as claimed in claim 1, wherein the controller (6, 16) is configured to identify a respective coupling factor between each of the plurality of transmitting coils (2, 3, 11, 12, 13, 30, 31, 32) and each of the plurality of receiving coils (4, 5, 14, 15) for each of the plurality of transmitting coils (2, 3, 11, 12, 13, 30, 31, 32) in an identification mode, and to select, according to the respective coupling factors, the predetermined number of the plurality of transmitting coils (2, 3, 11, 12, 13, 30, 31, 32) which are activated in the energy transmission mode based on a greatest coupling factor of the identified respective coupling factors.

3. The energy transmission device (1, 10) as claimed in claim 1, wherein in the case of sequential activation of the predetermined number of the plurality of transmitting coils (2, 3, 11, 12, 13, 30, 31, 32), the controller (6, 16) is configured to activate each of the predetermined number of the plurality of transmitting coils (2, 3, 11, 12, 13, 30, 31, 32) for a period of less than one second.

4. The energy transmission device (1, 10) as claimed in claim 1, comprising an alternating-current source (19) which is configured to generate an alternating current for activating the predetermined number of the plurality of transmitting coils (2, 3, 11, 12, 13, 30, 31, 32), and a toggle switch (20) which is configured to couple the alternating-current source (19) electrically to one of the predetermined number of the plurality of transmitting coils (2, 3, 11, 12, 13, 30, 31, 32) in a controllable manner, wherein the controller (6, 16) is configured to activate the toggle switch (20) in order to activate one of the respective transmitting coils (2, 3, 11, 12, 13, 30, 31, 32).

5. The energy transmission device (1, 10) as claimed in claim 1, wherein the controller (6, 16) is configured to determine the predetermined number dynamically, based on a limit value for a coupling factor between the respective transmitting coil (2, 3, 11, 12, 13, 30, 31, 32) and one of the plurality of receiving coils (4, 5, 14, 15), wherein the controller (6, 16) is configured to sequentially control only coil pairs of the respective transmitting coil (2, 3, 11, 12, 13, 30, 31, 32) and the plurality of receiving coils (4, 5, 14, 15) with coupling factors above the limit value.

6. The energy transmission device (1, 10) as claimed in claim 1, wherein in the case of sequential activation of the predetermined number of the plurality of transmitting coils (2, 3, 11, 12, 13, 30, 31, 32), the controller (6, 16) is configured to activate each of the predetermined number of the plurality of transmitting coils (2, 3, 11, 12, 13, 30, 31, 32) for a period of less than 500 milliseconds.

7. The energy transmission device (1, 10) as claimed in claim 1, wherein in the case of sequential activation of the predetermined number of the plurality of transmitting coils (2, 3, 11, 12, 13, 30, 31, 32), the controller (6, 16) is configured to activate each of the predetermined number of the plurality of transmitting coils (2, 3, 11, 12, 13, 30, 31, 32) for a period of less than 250 milliseconds.

8. The energy transmission device (1, 10) as claimed in claim 1, wherein in the case of sequential activation of the predetermined number of the plurality of transmitting coils (2, 3, 11, 12, 13, 30, 31, 32), the controller (6, 16) is configured to activate each of the predetermined number of the plurality of transmitting coils (2, 3, 11, 12, 13, 30, 31, 32) for a period of less than 100 milliseconds.

9. An energy transmission method for a contactless transmission of electrical energy, the method comprising:
providing (S1) a plurality of transmitting coils (2, 3, 11, 12, 13, 30, 31, 32) and a plurality of receiving coils (4, 5, 14, 15), and
sequentially activating (S2) a predetermined number of the plurality of transmitting coils (2, 3, 11, 12, 13, 30, 31, 32) in an energy transmission mode,
wherein in a case of the sequential activation of the predetermined number of the plurality of transmitting coils (2, 3, 11, 12, 13, 30, 31, 32) a respective transmitting coil (2, 3, 11, 12, 13, 30, 31, 32) which has a greatest spacing from a last-activated transmitting coil (2, 3, 11, 12, 13, 30, 31, 32) is activated next.

10. The energy transmission method as claimed in claim 9, wherein a respective coupling factor to one of the individual receiving coils (4, 5, 14, 15) is identified for each of the plurality of transmitting coils (2, 3, 11, 12, 13, 30, 31, 32) in an identification mode, and the predetermined number of the plurality of transmitting coils (2, 3, 11, 12, 13, 30, 31, 32) which are activated in the energy transmission mode are selected according to the respective coupling factor, based on a greatest coupling factor among the identified respective coupling factors.

11. The energy transmission method as claimed in claim 9, wherein in the case of sequential activation of the predetermined number of the plurality of transmitting coils (2, 3, 11, 12, 13, 30, 31, 32), each of the predetermined number of the plurality of transmitting coils (2, 3, 11, 12, 13, 30, 31, 32) is activated for a period of less than one second.

12. The energy transmission method as claimed in claim 9, comprising generating an alternating current for activating the predetermined number of the plurality of transmitting coils (2, 3, 11, 12, 13, 30, 31, 32), and respectively electrically coupling the alternating current to a corresponding one of the predetermined number of the plurality of transmitting coils (2, 3, 11, 12, 13, 30, 31, 32).

13. The energy transmission method as claimed in claim 9, wherein the predetermined number is determined dynamically, based on a limit value for a coupling factor between a respective transmitting coil (2, 3, 11, 12, 13, 30, 31, 32) and one of the plurality of receiving coils, wherein only coil pairs of the respective transmitting coil (2, 3, 11, 12, 13, 30, 31, 32) and the plurality of receiving coils (4, 5, 14, 15) with coupling factors above the limit value are controlled sequentially.

14. The energy transmission method as claimed in claim 9, wherein in the case of sequential activation of the predetermined number of the plurality of transmitting coils (2, 3, 11, 12, 13, 30, 31, 32), each of the predetermined number of the plurality of transmitting coils (2, 3, 11, 12, 13, 30, 31, 32) is activated for a period of less than 500 milliseconds.

15. The energy transmission method as claimed in claim 9, wherein in the case of sequential activation of the predetermined number of the plurality of transmitting coils (2, 3, 11, 12, 13, 30, 31, 32), each of the predetermined number of the plurality of transmitting coils (2, 3, 11, 12, 13, 30, 31, 32) is activated for a period of less than 250 milliseconds.

16. The energy transmission method as claimed in claim 9, wherein in the case of sequential activation of the predetermined number of the plurality of transmitting coils (2, 3, 11, 12, 13, 30, 31, 32), each of the predetermined number of the plurality of transmitting coils (2, 3, 11, 12, 13, 30, 31, 32) is activated for a period of less than 100 milliseconds.

* * * * *